United States Patent
Da Silva et al.

(10) Patent No.: US 10,083,407 B2
(45) Date of Patent: Sep. 25, 2018

(54) AD HOC TASK CREATION AND PROCESS MODIFICATION

(75) Inventors: Alfredo F. Da Silva, Durham, NC (US); Loretta A. Hicks, Durham, NC (US); Tyler S. Lacock, Morrisville, NC (US); Mari M. Wade, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1931 days.

(21) Appl. No.: 12/273,824

(22) Filed: Nov. 19, 2008

(65) Prior Publication Data

US 2010/0125846 A1    May 20, 2010

(51) Int. Cl.
G06Q 10/06    (2012.01)
G06F 9/50     (2006.01)

(52) U.S. Cl.
CPC .......... *G06Q 10/06* (2013.01); *G06F 9/5038* (2013.01); *G06Q 10/06316* (2013.01)

(58) Field of Classification Search
CPC . G06Q 10/06; G06Q 10/06316; G06F 9/5038
USPC ....................................................... 705/301
See application file for complete search history.

(56) References Cited

U.S. PATENT DOCUMENTS

| | | | |
|---|---|---|---|
| 6,003,011 A * | 12/1999 | Sarin et al. | 705/7.26 |
| 2002/0184219 A1* | 12/2002 | Preisig et al. | 707/10 |
| 2006/0075207 A1 | 4/2006 | Togawa et al. | |
| 2007/0169103 A1* | 7/2007 | Bhatkhande et al. | 717/170 |
| 2008/0155540 A1* | 6/2008 | Mock et al. | 718/100 |
| 2008/0209168 A1 | 8/2008 | Yokota | |
| 2008/0270597 A1* | 10/2008 | Tenenti | H04L 41/18 709/224 |

FOREIGN PATENT DOCUMENTS

| | | |
|---|---|---|
| TW | I273495 B | 2/2007 |
| TW | I287717 B | 10/2007 |
| TW | 201023044 A | 6/2010 |

OTHER PUBLICATIONS

"Adding a Task that Runs a New Business Process," http://publisb.boulder.ibm.com/infocenter/casemgmt/v5r0m0/topic/com.ibm.casemgmtinstallling.doc/acmcp012.htm.*
ComputerWorld, vol. 38, iss. 17, Apr. 2004, "IBM Refocuses Websphere on Service-oriented Architectures,".*
Sadtler, Carla, et al. "Enabling SOA using WebSphere Messaging," Mar. 14, 2006.*
"IBM Websphere Application Server" http://en/wikipedia.org/wiki/IBM_WebSphere_Application_Server.*

* cited by examiner

*Primary Examiner* — Carrie Stroder Gilkey

(74) *Attorney, Agent, or Firm* — Cuenot, Forsythe & Kim, LLC

(57) ABSTRACT

The invention provides a method, system, and program product for modifying a computer-executed process. In one embodiment, the invention includes creating an ad hoc task for inclusion in an existing process, accessing the existing process, and adding the ad hoc task to the existing process.

12 Claims, 5 Drawing Sheets

US 10,083,407 B2

AD HOC TASK CREATION AND PROCESS MODIFICATION

TECHNICAL FIELD

The present invention relates generally to task creation for a computer-executed process and, more particularly, to the creation of an ad hoc task and the addition of such a task to an existing computer-executed process.

BACKGROUND OF THE INVENTION

Business process management (BPM) is the aligning of an organization and its operation with the organization's objective(s) and/or the wants, needs, or requirements of the organization's clients or consumer's of the organization's goods or services. BPM may include the modification of computer-executed processes.

For example, FIG. 1 shows the modification of an existing process according to known methods. At 1, an existing process is accessed. The scope and operation of such a process is virtually unlimited and will vary, of course, based on the particular technology and field of endeavor at hand. For example, the process may involve the optimization and searching of a database. In such a case, Task 1 of the existing process may be to optimize the database, Task 2 may be to search the database based on one or more search terms, and Task 3 may be to report the search results in a particular format. At 2, one or more tasks are selected from a collection of pre-defined task templates and added to the existing process. The result 3 is an updated process that includes the added pre-defined task.

According to known methods, the addition of a pre-defined task to an existing task is accomplished using an application programming interface (API). Some APIs, such as International Business Machine Corporation's Websphere® Process Server (WPS) Task API, utilize raw code to create such tasks. These APIs are difficult to master and use and require a new code base for each new context.

Another deficiency of known methods is the limitation of the tasks to be added to pre-defined tasks. In some cases, the particular task that is needed does not yet exist (i.e., it has not been pre-defined). In such a case, modification of the process to include the needed task requires that the task first be defined and added to the pre-defined tasks available to a user. This results in significant delay in managing the process and will generally incur additional expense.

Accordingly, there exists a need in the art to overcome the deficiencies and limitations described hereinabove.

SUMMARY OF THE INVENTION

The invention provides a method, system, and program product for modifying a computer-executed process.

A first aspect of the invention provides a method of modifying a computer-executed process, the method comprising: creating an ad hoc task for inclusion in an existing process; accessing the existing process; and adding the ad hoc task to the existing process.

A second aspect of the invention provides a system for modifying a computer-executed process, the system comprising: a system for creating an ad hoc task for inclusion in an existing process; a system for accessing the existing process; and a system for adding the ad hoc task to the existing process.

A third aspect of the invention provides a program product stored on a computer-readable medium, which when executed, is operable to modify a computer-executed process, the program product comprising: program code for creating an ad hoc task for inclusion in an existing process; program code for accessing the existing process; and program code for adding the ad hoc task to the existing process.

A fourth aspect of the invention provides a method for deploying an application for modifying a computer-executed process, comprising: providing a computer infrastructure being operable to: create an ad hoc task for inclusion in an existing process; access the existing process; and add the ad hoc task to the existing process.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Unlike known solutions, the present invention permits the creation of ad hoc (i.e., not pre-defined) tasks without relying on the use of raw code. In an illustrative embodiment of the invention, the WPS Task API is extracted through the use of a JavaServer Pages (JSP) interface.

Figure 1:
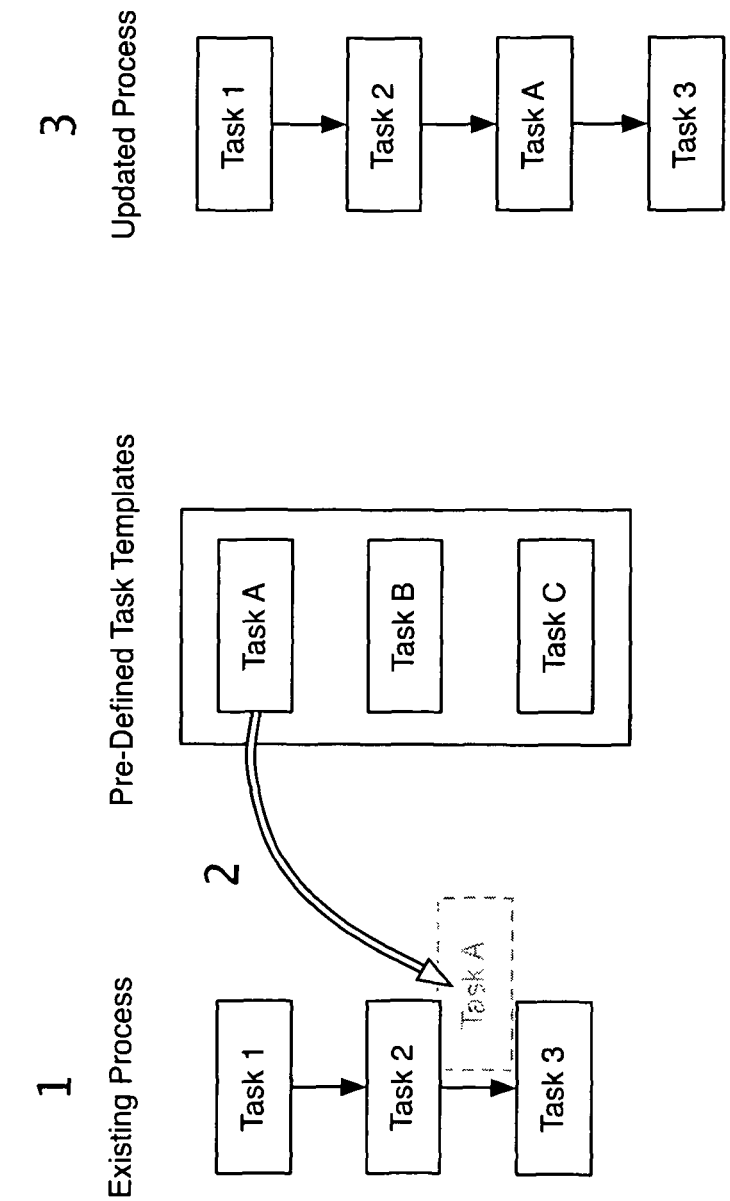
FIG. 1 shows a known method of modifying an existing computer-executed process.
Figure 2:
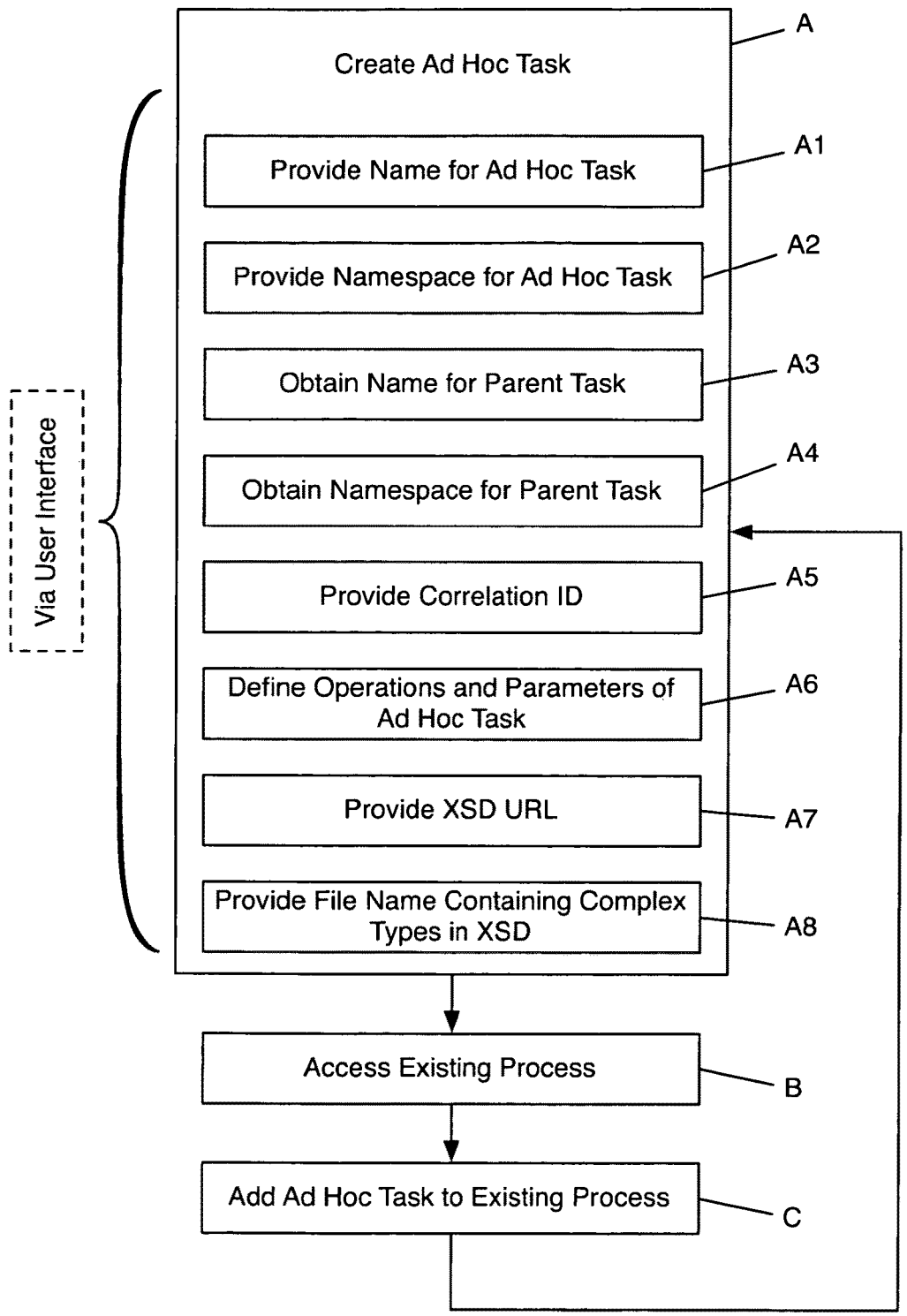
FIG. 2 shows a flow diagram of an illustrative method according to an embodiment of the invention.

FIG. 2 shows a flow diagram of an illustrative method according to an embodiment of the invention. At A, an ad hoc task is created. Creating such an ad hoc task may include a number of sub-tasks. The type and number of such sub-tasks may vary, depending, for example, on the API chosen. FIG. 2 will be described with respect to an ad hoc task created using the WPS Task API using a JSP interface, as noted above. Other techniques are possible, however, as will be recognized by one skilled in the art, and are within the scope of the present invention.

As shown in FIG. 2, creating the ad hoc task at A includes a number of sub-tasks, namely, providing a name for the ad hoc task at A1, providing a namespace for the ad hoc task at A2, obtaining a name for the parent task to which the ad hoc task will be added at A3, obtaining a namespace for the parent task at A4, providing a correlation ID at A5, defining the operations and parameters of the ad hoc task at A6 (which may include, for example, providing a Web Services Description Language (WSDL) Uniform Resource Locator (URL)), providing an Extensible Markup Language (XML) Schema Definition (XSD) URL at A7, and providing a file name containing complex types in XSD at A8. Each of these and similar sub-tasks will be familiar to one skilled in the art and are presented for purposes of illustration only. In some embodiments, the ad hoc task, including some or all of its sub-tasks, may be created using a user interface, such as the JSP interface described above, or any other user interface.

Once the ad hoc task is created at A, an existing process is accessed at B. Alternatively, the existing process could first be accessed and the ad hoc task then created. In either case, at C, the ad hoc task is added to the existing process. In some cases, the existing process may be running when the process is accessed and/or when the ad hoc task is added. In some embodiments, A through C may be iteratively looped such that a plurality of ad hoc tasks are created and added to an existing process.

Figure 3:
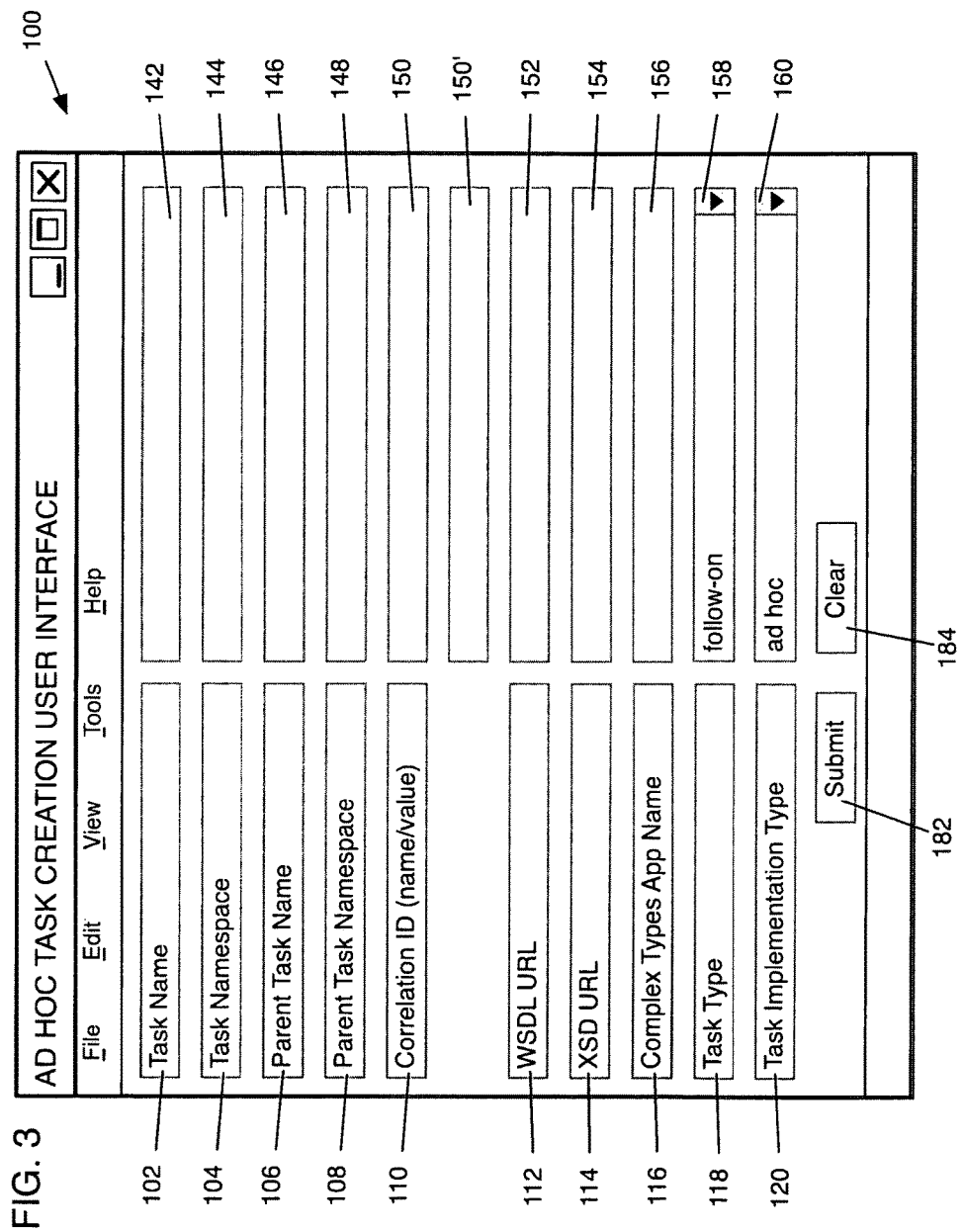
FIG. 3 shows an illustrative user interface for creating an ad hoc task according to an embodiment of the invention.

FIG. 3 shows an illustrative user interface 100 for creating an ad hoc task according to an embodiment of the invention, such as may be provided by a JSP interface. As can be seen, the user interface 100 includes a label and data entry field for the Task Name 102, 142, Task Namespace 104, 144, Parent Task Name 106, 146, Parent Task Namespace 108, 148, Correlation ID name and value 110, 150, 150', WSDL URL 112, 152, XSD URL 114, 154, Complex Types Application Name 116, 156, Task Type 118, 158, and Task Implementation Type 120, 160. Each of these is described above with respect to the method shown in FIG. 2. The user interface 100 further includes submit and clear buttons 182, 184 for executing the ad hoc task creation and clearing the contents of the user interface 100, respectively. Other or different functionality may be provided via the user interface 100, as will be recognized by one skilled in the art.

Figure 4:
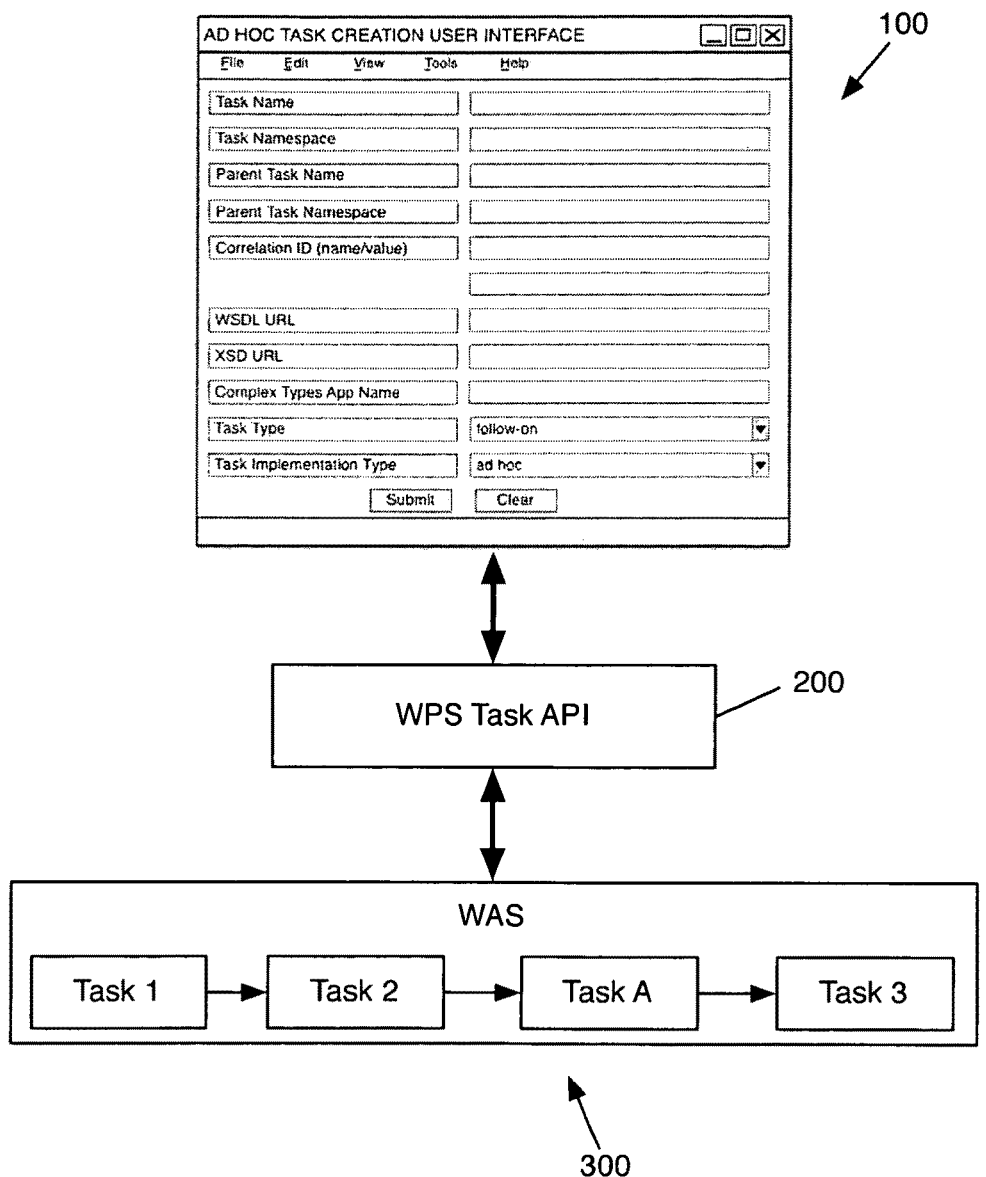
FIG. 4 shows the user interface of FIG. 3 in relation to a Websphere® Process Server (WPS) Task API and Websphere® Process Server (WPS)

FIG. 4 is a block diagram showing the relationships among the user interface 100, WPS Task API 200, and WPS 300. The user interface 100 provides convenient and easy-to-use access to the WPS Task API which, as noted above, avoids a user having to manipulate raw code. The WPS Task API 200, in turn, enables the creation of an ad hoc task (Task A) in the WPS 300, as well as the addition of the ad hoc task to an existing process.

Figure 5:
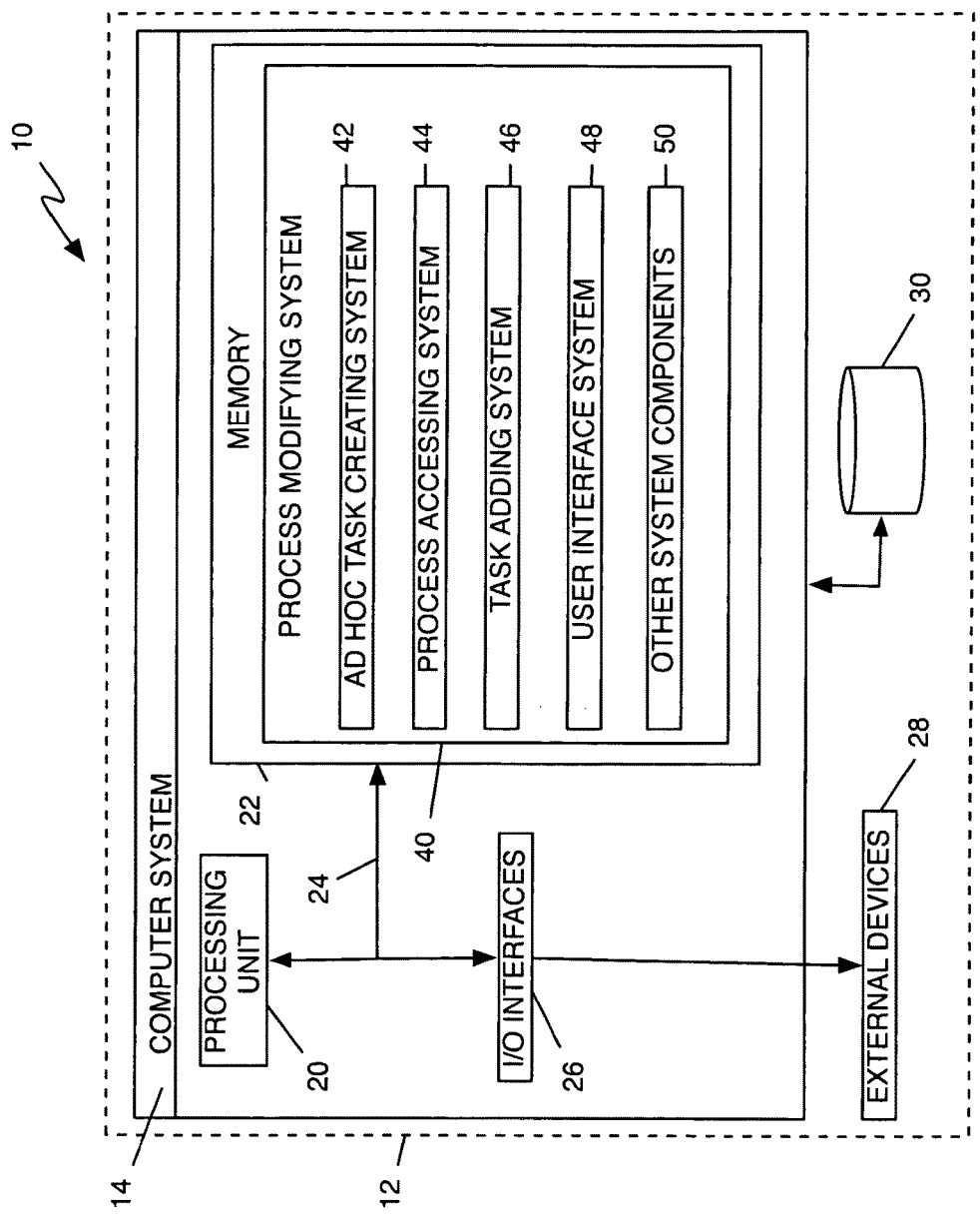
FIG. 5 shows a block diagram of an illustrative system according to an embodiment of the invention.

FIG. 5 shows an illustrative system 10 for modifying a computer-executed process. To this extent, system 10 includes a computer infrastructure 12 that can perform the various process steps described herein for modifying a computer-executed process. In particular, computer infrastructure 12 is shown including a computer system 14 that comprises process modifying system 40, which enables computer system 14 to modify a computer-executed process by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as process modifying system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and process modifying system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the process modifying system 40 enables the computer system 14 to modify a computer-executed process. To this extent, the process modifying system 40 is shown including an ad hoc task creating system 42, a process accessing system 44, a task adding system 46, and a user interface system 48. Operation of each of these systems is discussed above. The process modifying system 40 may further include other system components 50 to provide additional or improved functionality to the process modifying system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for modifying a computer-executed process, it is understood that the invention further provides various alternative embodiments. For example, in one embodiment, the invention provides a computer-readable medium that includes computer program code to enable a computer infrastructure to modify a computer-executed process. To this extent, the computer-readable medium includes program code, such as process modifying system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to modify a computer-executed process, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

in still another embodiment, the invention provides a method of generating a system for modifying a computer-executed process. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method, comprising:
providing a first version of a machine-readable process data structure defining an existing process including a plurality of tasks;
creating, using an ad hock task creation graphical user interface, an ad hoc task data structure defining an ad hoc task, with the ad hoc task data structure being created without the user manipulating raw code used to define predefined tasks; and
creating a second version of the process data structure by adding the ad hock task data structure to the first version of the process data structure, wherein
the creating the ad hoc task data structure includes:
receiving an identification of a parent task from the plurality of tasks,
receiving an ad hoc task name for the ad hoc task,
providing an ad hoc namespace for the ad hoc task,
obtaining a parent name for the parent task,
obtaining a parent namespace for the parent task, and
providing a correlation identification that defines operations and parameters of the ad hoc task.

2. The method of claim 1, wherein the operations and parameters include the following:
providing a Web Services Description Language (WSDL) Uniform Resource Locator (URL),
providing an Extensible Markup Language (XML) Schema Definition (XSD) URL, and
providing a file name containing complex types in XSD.

3. The method of claim 1, wherein the creating the ad hoc task data structure is performed through a JSP interface.

4. The method of claim 1, wherein the creating the ad hoc task data structure is performed through a JSP interface.

5. A computer hardware system, comprising:
a hardware processor configured to execute the following executable operations:
providing a first version of a machine-readable process data structure defining an existing process including a plurality of tasks;
creating, using an ad hock task creation graphical user interface, an ad hoc task data structure defining an ad hoc task, with the ad hoc task data structure being created without the user manipulating raw code used to define predefined tasks; and
creating a second version of the process data structure by adding the ad hock task data structure to the first version of the process data structure, wherein
the creating the ad hoc task data structure includes:
receiving an identification of a parent task from the plurality of tasks,
receiving an ad hoc task name for the ad hoc task,
providing an ad hoc namespace for the ad hoc task,
obtaining a parent name for the parent task,
obtaining a parent namespace for the parent task, and
providing a correlation identification that defines operations and parameters of the ad hoc task.

6. The system of claim 5, wherein the operations and parameters include the following:
providing a Web Services Description Language (WSDL) Uniform Resource Locator (URL),
providing an Extensible Markup Language (XML) Schema Definition (XSD) URL, and
providing a file name containing complex types in XSD.

7. The system of claim 5, wherein the creating the ad hoc task data structure is performed through a JSP interface.

8. The system of claim 5, wherein the creating the ad hoc task data structure is performed through a JSP interface.

9. A computer program product, comprising:
a non-transitory computer readable medium device having stored therein computer program code,
the computer program code, which when executed by a computer hardware system, causes the computer hardware system to perform:
providing a first version of a machine-readable process data structure defining an existing process including a plurality of tasks;
creating, using an ad hock task creation graphical user interface, an ad hoc task data structure defining an ad hoc task, with the ad hoc task data structure being created without the user manipulating raw code used to define predefined tasks; and creating a second version of the process data structure by adding the ad hock task data structure to the first version of the process data structure, wherein
the creating the ad hoc task data structure includes:
receiving an identification of a parent task from the plurality of tasks,
receiving an ad hoc task name for the ad hoc task,
providing an ad hoc namespace for the ad hoc task,
obtaining a parent name for the parent task,
obtaining a parent namespace for the parent task, and
providing a correlation identification that defines operations and parameters of the ad hoc task.

10. The computer program product of claim 9, wherein the operations and parameters include the following:
providing a Web Services Description Language (WSDL) Uniform Resource Locator (URL),
providing an Extensible Markup Language (XML) Schema Definition (XSD) URL, and
providing a file name containing complex types in XSD.

11. The computer program product of claim 9, wherein the creating the ad hoc task data structure is performed through a JSP interface.

12. The computer program product of claim 9, wherein the creating the ad hoc task data structure is performed through a JSP interface.

* * * * *